United States Patent
Chowdary et al.

(10) Patent No.: US 7,676,589 B2
(45) Date of Patent: Mar. 9, 2010

(54) AUTOMATIC GENERATION OF PORTLETS FOR VISUALIZING DATA BY EXPLOITING OBJECT RELATIONSHIPS

(75) Inventors: Hanumaiah Chowdary, Foster City, CA (US); Amber Roy-Chowdhury, Cary, NC (US); Srikanth Thirumalai, Clyde Hill, WA (US); Ajamu Wesley, Marlborough, MA (US)

(73) Assignee: International Business Machines Corporation, Armonk, NY (US)

( * ) Notice: Subject to any disclaimer, the term of this patent is extended or adjusted under 35 U.S.C. 154(b) by 480 days.

(21) Appl. No.: 11/422,098

(22) Filed: Jun. 5, 2006

(65) Prior Publication Data

US 2007/0283020 A1    Dec. 6, 2007

(51) Int. Cl.
*G06F 15/16*    (2006.01)
*G06F 7/00*    (2006.01)

(52) U.S. Cl. ...................... 709/230; 707/102
(58) Field of Classification Search ......... 709/217–230; 715/530; 707/100–102, 103 X, 103 Y, 103 Z, 707/103 R, 104.1
See application file for complete search history.

(56) References Cited

U.S. PATENT DOCUMENTS

| | | | |
|---|---|---|---|
| 6,968,344 B2 * | 11/2005 | Bahulkar et al. | 707/103 R |
| 7,313,561 B2 * | 12/2007 | Lo et al. | 707/100 |
| 2003/0126558 A1 | 7/2003 | Griffin | |
| 2004/0010598 A1 * | 1/2004 | Bales et al. | 709/228 |
| 2004/0090969 A1 | 5/2004 | Jerrard-Dunne et al. | |
| 2004/0133660 A1 | 7/2004 | Junghuber et al. | |
| 2005/0021765 A1 | 1/2005 | Flores et al. | |
| 2005/0050021 A1 | 3/2005 | Timmons | |
| 2005/0055634 A1 * | 3/2005 | Burns et al. | 715/517 |
| 2005/0071853 A1 | 3/2005 | Jones et al. | |
| 2005/0175015 A1 | 8/2005 | Ramaswamy et al. | |
| 2005/0177815 A1 | 8/2005 | Kurz et al. | |
| 2005/0198615 A1 | 9/2005 | Choi et al. | |
| 2005/0223081 A1 | 10/2005 | McMahan et al. | |
| 2006/0004913 A1 * | 1/2006 | Chong | 709/217 |
| 2007/0124663 A1 * | 5/2007 | Fischer et al. | 715/501.1 |

* cited by examiner

*Primary Examiner*—William C Vaughn, Jr.
*Assistant Examiner*—Shirley X Zhang
(74) *Attorney, Agent, or Firm*—Cuenot, Forsythe & Kim, LLC

(57) ABSTRACT

A method of automatically creating portlets for a portal system can include identifying a location of structured data described by a data model specification and automatically determining, from the data model specification, relationships between a plurality of objects within the structured data. The method further can include automatically generating a plurality of portlets, wherein each portlet is configured to query the structured data according to the relationships specified within the data model specification. One or more communication links between at least two of the portlets can be automatically created according to the relationships specified within the data model specification.

17 Claims, 6 Drawing Sheets

305 {
ORDERS, defined by schema
ORDERS(
    ORDER_ID BIGINT NOT NULL,
    CUSTOMER_ID BIGINT NOT NULL,
    STATUS VARCHAR(32) NOT NULL,
    DATE_PLACED DATE NOT NULL,
    DATE_COMPLETED DATE,
    MONTH INTEGER NOT NULL,
    YEAR INTEGER NOT NULL,
    CONSTRAINT ORDERSPK PRIMARY KEY (ORDER_ID),
    CONSTRAINT ORDERSFK1 FOREIGN KEY (CUSTOMER_ID) REFERENCES
        CUSTOMERS (CUSTOMER_ID) ON DELETE CASCADE
)

300

310 {
CUSTOMERS, defined by schema
CUSTOMERS(
    CUSTOMER_ID BIGINT NOT NULL,
    FIRSTNAME VARCHAR(32) NOT NULL,
    LASTNAME VARCHAR(32) NOT NULL,
    ADDRESS1 VARCHAR(128) NOT NULL,
    ADDRESS2 VARCHAR(128),
    CITY VARCHAR(64) NOT NULL,
    STATE VARCHAR(64),
    ZIPCODE INTEGER NOT NULL,
    COUNTRY VARCHAR(64) DEFAULT 'USA',
    EMAIL VARCHAR(128),
    PHONE BIGINT NOT NULL,
    CONSTRAINT CUSTOMERSPK PRIMARY KEY (CUSTOMER_ID)
)

315 {
ORDERDETAILS, defined by schema
ORDERDETAILS(
    ORDER_ID BIGINT NOT NULL,
    PART_ID VARCHAR(64) NOT NULL,
    QUANTITY INTEGER NOT NULL,
    CONSTRAINT ORDERDETAILSPK PRIMARY KEY (ORDER_ID, PART_ID),
    CONSTRAINT ORDERDETAILSFK1 FOREIGN KEY (ORDER_ID)
REFERENCES ORDERS (ORDER_ID) ON DELETE CASCADE,
    CONSTRAINT ORDERDETAILSFK2 FOREIGN KEY (PART_ID) REFERENCES
PARTS (PART_ID) ON DELETE CASCADE
)

320 {
PARTS, defined by schema
PARTS(
    PART_ID VARCHAR(64) NOT NULL,
    PRICE REAL NOT NULL,
    PARTNAME VARCHAR(64) NOT NULL,
    DESCRIPTION VARCHAR(255),
    CONSTRAINT PARTSPK PRIMARY KEY (PART_ID)
)

| Table Name | Column Name | Types |
|---|---|---|
| ORDERS | ORDER_ID | OrderIDType |
| ORDERS | CUSTOMER_ID | CustomerIDType |
| CUSTOMERS | CUSTOMER_ID | CustomerIDType |
| ORDERDETAILS | ORDER_ID | OrderIDType |
| ORDERDETAILS | PART_ID | PartIDType |
| PARTS | PART_ID | PartIDType |

| Table Name | Portlet Action Name | Type of Action Input | Involves Join | Caption |
|---|---|---|---|---|
| ORDERS | queryOrdersByOrderID | OrderIDType | No | Query Orders |
| ORDERS | queryOrdersByCustomerID | CustomerIDType | No | Query Orders |
| ORDERS | queryOrdersByPartID | PartIDType | Yes | Query Orderdetails |
| ORDERDETAILS | queryOrderDetailsByOrderID | OrderIDType | No | Query Orderdetails |
| ORDERDETAILS | queryOrderDetailsByPartID | PartIDType | No | Query Orderdetails |
| ORDERDETAILS | queryOrderDetailsByCustomerID | CustomerIDType | Yes | Query Orderdetails |
| CUSTOMERS | queryCustomersByCustomerID | CustomerIDType | No | Query Customers |
| CUSTOMERS | queryCustomersByOrderID | OrderIDType | Yes | Query Customers |
| CUSTOMERS | queryCustomersByPartID | PartIDType | Yes | Query Customers |
| PARTS | queryPartsByPartID | PartIDType | No | Query Parts |
| PARTS | queryPartsByOrderID | OrderIDType | Yes | Query Parts |
| PARTS | queryPartsByCustomerID | CustomerIDType | Yes | Query Parts |

FIG. 7

AUTOMATIC GENERATION OF PORTLETS FOR VISUALIZING DATA BY EXPLOITING OBJECT RELATIONSHIPS

BACKGROUND

1. Field of the Invention

The present invention relates to a portal system and, more particularly, to the automated creation of portlets configured for inter-portlet communication.

2. Description of the Related Art

A portal is a Web site that serves as a starting point to access information and applications within a networked computing environment. Typically, a portal has an architecture that provides standard functions including, but not limited to, security, authorization, authentication, aggregation, caching, user management, enrollment, rendering, and the like. The portal provides the infrastructure necessary for aggregating other applications or application components called portlets. Portlets are also known by other names, depending upon the manufacturer or vendor, such as Web parts, iViews, or the like. A typical embodiment of this type of architecture includes an application programming interface (API) for integrating applications. Accordingly, portlets from different vendors can be used so long as such portlets are configured to utilize the API provided by the portal. For example, the WebSphere Portal family of products available from International Business Machines Corporation of Armonk, N.Y. (IBM) supports such computing environments.

Portlets are reusable components or applications. Within a portal environment, portlets provide access to Web-based content, applications, and other resources. Web pages, applications, and syndicated content feeds, for example, can be accessed through portlets. From a user perspective, a portlet is a window located in a portal page that provides a specific service or items of information. From an application development perspective, portlet code comprises pluggable modules that are designed to run inside a portlet container of a portal service.

Modern development tools provide several mechanisms to help developers create portlets. The developer typically is guided through a wizard-type process where the development tool asks the developer to specify or describe the data that is to be queried or otherwise manipulated by the portlet(s) being created. The metadata provided by the developer describes the structure of the data that is to be queried. Once this information is manually specified by the developer to the development tool, one or more portlets can be created automatically which can query or manipulate the underlying data.

The resulting portlets can perform one or more tasks in terms of querying the underlying data. These portlets function largely independently of one another and, as such, lack inter-portlet communication capability. It is the responsibility of the developer to manually specify the communication links through which the portlets will communicate with one another. For example, if a first portlet displays orders for an organization and a second portlet displays details for the orders, the first and second portlets would have to be coupled to allow data to be sent from one portlet to the other. Coupling allows an end user to view order information and order detail information for the same order without having to manually initiate a related query in each portlet, i.e. the order portlet and an order detail portlet.

Portal environments such as IBM WebSphere provide mechanisms for coupling portlets. One mechanism is referred to as a "click-to-action" control where information from one portlet is used to drive an action in a second portlet. While working in the portal development environment, the developer can select one of the click-to-action icons displayed in the source portlet. The source portlet refers to the portlet that will drive the action in the second portlet. Each click-to-action control is associated with a typed data item, or property. Upon selection of a click-to-action icon, a menu of actions which can process the associated property can be presented. The actions in the menu can be invoked with respect to one or more target portlets. A target portlet is a portlet that executes an action responsive to the source portlet. The target portlet is driven by the source portlet. The source and target portlets typically are displayed upon the same portal page, although this is not a strict requirement. The user can select an action from the menu, which causes code to be executed on the source portlet such that during operation, i.e. at runtime, a request is delivered from the source portlet to the target portlet to perform the selected action. The property associated with the click-to-action control is passed to the target portlet as an input to the action.

Another mechanism for communicatively linking portlets can be through what are referred to as "wires". A wire refers to a persistent association between a property in a source portlet and an action to be performed in a target portlet. When an event occurs that affects the property of a wire, the action associated with that property is triggered in the target portlet. Further information regarding inter-portlet communication can be found in IBM Rational Application Developer V6 Portlet Application Development and Portal Tools (August 2005).

While portlets presently provide a high degree of functionality, it would be beneficial to provide a means by which portlets having inter-portlet communication capabilities can be created in a more automated fashion.

SUMMARY OF THE INVENTION

The present invention provides method(s), system(s), and apparatus relating to the creation of portlets for use with a portal-based system. One embodiment of the present invention can include a method of automatically creating portlets for a portal system. The method can include identifying a location of structured data described by a data model specification and automatically determining, from the data model specification, relationships between a plurality of objects within the structured data. The method further can include automatically generating a plurality of portlets, wherein each portlet is configured to query the structured data according to the relationships specified in the data model specification. One or more communication links can be automatically created between two or more of the portlets according to the relationships specified within the data model specification.

Another embodiment of the present invention can include a method of automatically implementing portlets for a portal system. The method can include receiving a user input specifying data having a structure specified by a data model specification and analyzing the data model specification to automatically identify relationships between objects in the data. The method also can include automatically creating a plurality of portlets configured to access the data according to the relationships identified between the objects. Code in at least a first portlet of the plurality of portlets can be generated for communicating with at least a second portlet of the plurality of portlets according to the relationships identified between the objects.

Yet another embodiment of the present invention can include a machine readable storage being programmed to cause a machine to perform the various steps and/or functions described herein.

BRIEF DESCRIPTION OF THE DRAWINGS

Presently preferred embodiments are shown in the drawings. It should be appreciated, however, that the invention is not limited to the precise arrangements and instrumentalities shown.

FIG. 3 is a diagram illustrating a data model specification that is useful for understanding the embodiments disclosed herein.

FIG. 6 is a table illustrating a mapping that can be derived from the data model specification illustrated in FIG. 3.

FIG. 7 is a table illustrating exemplary portlet actions that can be automatically determined and generated in accordance with one embodiment of the present invention.

DETAILED DESCRIPTION OF THE INVENTION

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Figure 1:
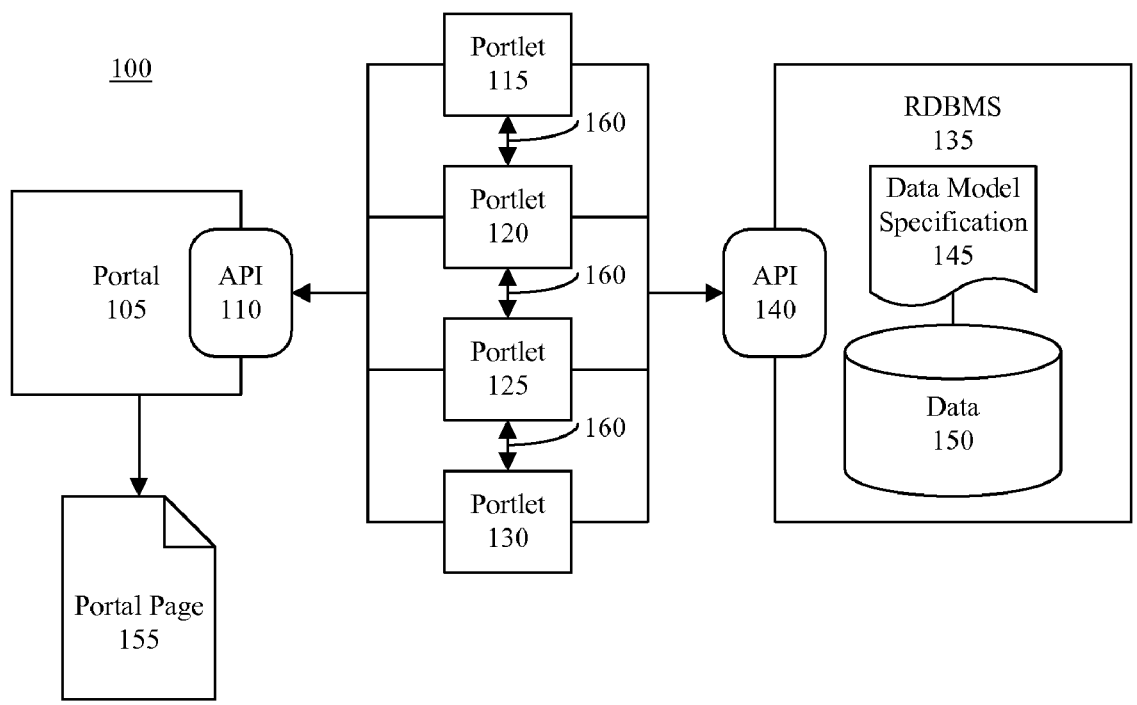
FIG. 1 is a block diagram of a portal system that is useful for understanding the embodiments disclosed herein.

FIG. 1 is a block diagram of a portal system 100 that is useful for understanding the embodiments disclosed herein. As shown, the portal system 100 can include a portal 105 having an application programming interface (API) 110 through which a plurality of portlets 115, 120, 125, and 130 can communicate. The portal system 100 further can include a relational database management system (RDBMS) 135. The RDBMS 135 can include an API 140 through which the portlets 115-130 can access data 150 of the RDBMS 135. The RDBMS 135 further can include a data model specification 145, for example a database schema which describes the structure of the data 150. As shown, the portal 105 can create or render portal pages 155 which can include various items of information collected and/or determined through the use of one or more of the portlets 115-130.

In accordance with one embodiment of the present invention, the portlets 115-130 can be created automatically using a software development tool to be described herein in further detail. The portlets 115-130 can be configured with inter-portlet communication capabilities through inter-portlet communication links 160. This coupling can be implemented automatically by the development tool through analysis of the data model specification 145 and subsequent code generation.

Figure 2:
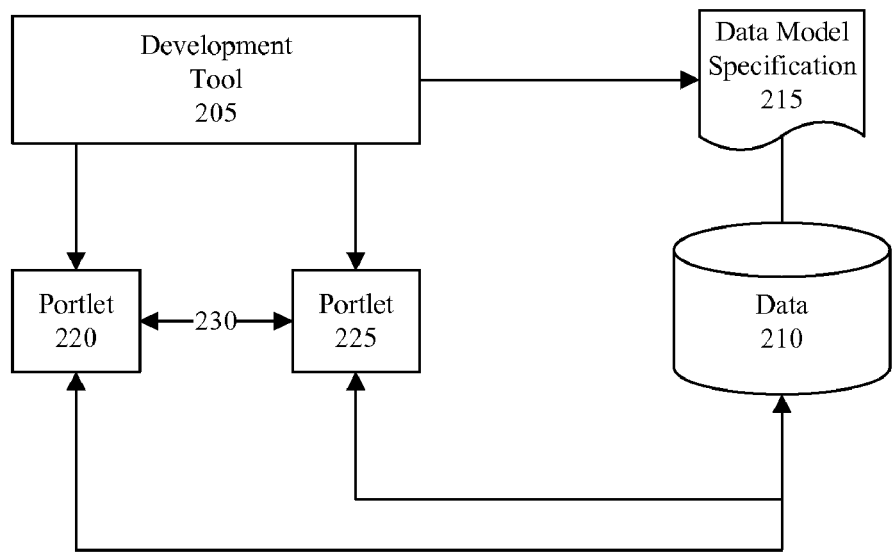
FIG. 2 is a block diagram of a portlet development system that is useful for understanding the embodiments disclosed herein.

FIG. 2 is a block diagram of a portlet development system 200 that is useful for understanding the embodiments disclosed herein. The system 200 can include a development tool 205, data 210, and an associated data model specification 215. In one embodiment, the development tool can be a function or application implemented as part of the IBM WebSphere® family of software development tools, i.e. IBM® Rational® Application Developer for WebSphere® Software, WebSphere® Studio Application Developer, WebSphere® Portal Application Integrator, or WebSphere Portlet Factory.

The data 210 can be any collection of ordered or relational data, i.e. data having a specified structure. That is, the data 210 can be organized according to a data model. A data model can describe the structure of the data, i.e. the hierarchy and/or relationships among the various objects within the data 210, the integrity of the data 210, how to query and/or otherwise manipulate the data 210, etc. The expression of the data model in a particular format or type of computer readable electronic document can be referred to as the data model specification 215. For example, in the case where the data 210 is data contained in an RDBMS, the data model specification 215 can be a database schema. In another embodiment, the data model specification 215 can be expressed as a Unified Modeling Language (UML) class diagram. It should be appreciated that the particular way in which the data model is expressed is not intended to be a limitation of the present invention, so long as the expression of the data model can be read or input into the development tool 205.

The development tool 205 can automatically generate portlets 220 and 225. In addition to creating each portlet 220 and 225, the development tool 205 can create a link 230 between portlets 220 and 225 such that the two portlets 220 and 225 can communicate with one another. In general, the development tool 205 can analyze, or introspect, the data model specification 215. From the data model specification 215, the development tool can map the relationships among various objects of the data. Each of portlets 220 and 225 can be created to perform one or more types of actions, i.e. queries into the data 210. By identifying the dependencies and organization of the data 210, the development tool can create a link 230 between portlets 220 and 225. The link 230 allows portlets 220 and 225 to share information between one another and/or trigger actions from one portlet to another. In one embodiment, the link 230 can be implemented as a wire. In another embodiment, the link 230 can be implemented as a click-to-action control.

FIG. 3 is a diagram illustrating a data model specification 300 that is useful for understanding the embodiments disclosed herein. As noted, the data model specification 300 can specify the structure of data. For purposes of illustration, the data model specification 300 is one that describes data within an order entry system, for example, an order entry system implemented using an RDBMS. Thus, data model specification 300 can be implemented as a database schema. As shown, the data model specification 300 can include four sections

305, 310, 315, and 320, each referencing or describing a particular object, in this case a table, of the RDBMS.

Section 305 describes the structure of an "ORDERS" table. Section 310 describes the structure of a "CUSTOMERS" table. Section 315 describes the structure of an "ORDERDETAILS" table. Finally, section 320 describes the structure of a "PARTS" table. It should be appreciated that a data model specification can be more or less complex than the one illustrated with reference to FIG. 3 depending upon the particular system being implemented and its application.

Each section 305-320 specifies a primary key for each corresponding table. If applicable, foreign key relationships for the corresponding table also are specified. For example, the primary key for the ORDERS table as indicated by section 305 is ORDER_ID. The foreign key is CUSTOMER_ID. The primary key for the CUSTOMERS table as indicated by section 310 is CUSTOMER_ID. The primary keys for the ORDERDETAILS table as indicated by section 315 are ORDER_ID and PART_ID. The foreign keys are ORDER_ID and PART_ID. Finally, for the PARTS table corresponding to section 320, the primary key is PART_ID.

Figure 4:
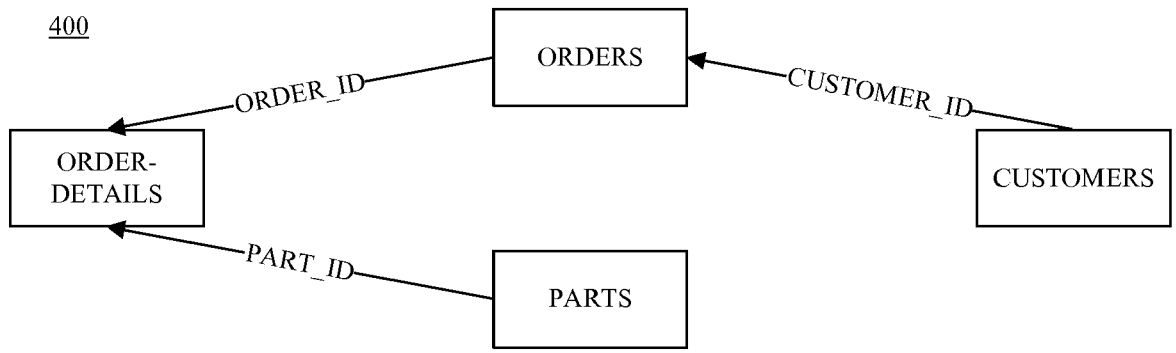
FIG. 4 is a block diagram illustrating object relationships that is useful for understanding the embodiments disclosed herein.

FIG. 4 is a block diagram 400 illustrating object relationships that is useful for understanding the embodiments disclosed herein. More particularly, FIG. 4 illustrates the relationships between the various tables described with reference to FIG. 3 as can be determined from foreign key constraints. The sort of query that may be useful for a user to perform, and thus the actions that can be performed by a portlet, can be inferred from the foreign key relationships between the various tables. For example, ORDER_ID is a foreign key from the ORDERDETAILS table to the ORDERS table. While viewing a particular row in the ORDERS table, it may be useful to query the ORDERDETAILS table to obtain the row corresponding to the foreign key. A reverse direction query may be useful as well.

The foreign key relationships described above are direct in that the relationships involve the use of a foreign key to move from a first table and index directly into a second table. Indirect, or transitive foreign, relationships also can be inferred from foreign keys. A transitive relationship, for example, can be one that involves a join of two or more database tables. For instance, while viewing a row in the ORDERS table, it may be useful to perform a query on the PARTS table to retrieve the parts that were ordered, or specified, as part of the current order. Such an action would involve two joins. The first join would involve using the ORDER_ID foreign key from the ORDERDETAILS table to access the ORDERS table. The second join would involve using the PART_ID foreign key from the PARTS table to access the ORDERDETAILS table. A reverse query could also be performed.

In one embodiment of the present invention, all possible relationships can be introspected and all possible connections can be created between generated portlets. In another embodiment, introspection can be limited to a particular depth. Such may be desirable from a user experience perspective or due to system performance limitations. For example, in the case of transitive relationships, introspection can be limited to direct relationships or relationships derived from only one or a particular number of intermediate relationships. Such option(s) can be provided through the development tool, for instance using a checkbox control and a text field through which the user can specify the depth of the relationships to be introspected.

In another embodiment, an option can be provided within the development tool through which the user can specify a subset of the relationships discovered through introspection for which connections are automatically generated between portlets. Such an option can be desirable due to system performance and/or user preference. For example, a list of possible inter-portlet connections can be displayed to the user. The user can select those connections that are to be created, i.e. using a checkbox or other user interface mechanism.

It should be appreciated that the level of introspection can be set independently of the level of inter-portlet connection(s) to be generated. Further, human-readable captions and descriptions can be assigned to the various properties, actions, and connections described herein beyond those suggested. For example, an option can be provided which allows the user to override the default use of table and column names as will be described herein in greater details. Once handler code is generated for a given connection, that code can be edited by the development tool user for customization.

Figure 5:
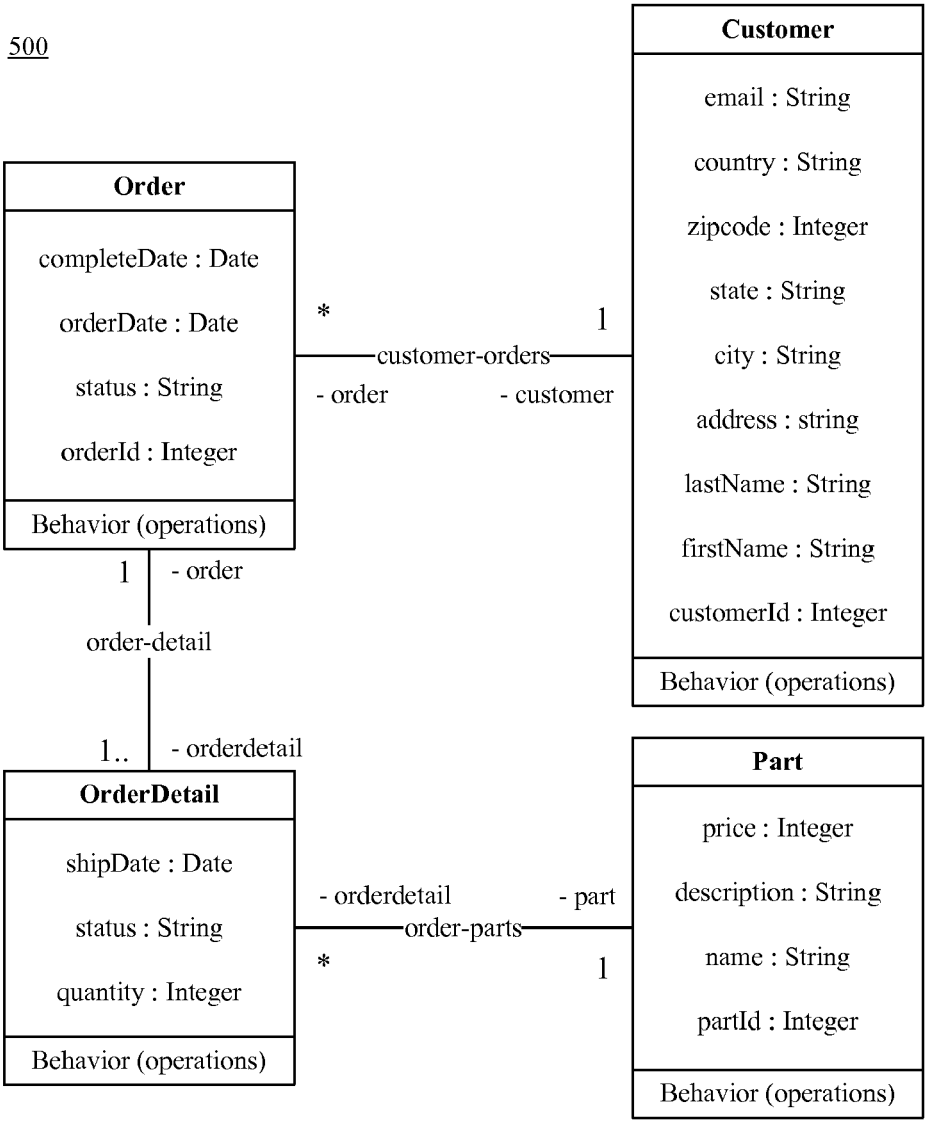
FIG. 5 is a Unified Modeling Language class diagram describing structured data which is useful for understanding the embodiments disclosed herein.

FIG. 5 is a UML class diagram 500 describing structured data which is useful for understanding the embodiments disclosed herein. The UML class diagram of FIG. 5 illustrates another manner in which a data model can be expressed. For example, the UML class diagram illustrates another manner of expressing the data model described with reference to FIG. 3. As noted, it should be appreciated that the particular manner in which a data model is expressed, i.e. whether as a database schema, a UML class diagram, or other notation, is not intended to be a limitation of the present invention.

FIG. 6 is a table 600 illustrating a mapping that can be derived from the data model specification illustrated in FIG. 3. The types can be derived from the table column names in a straightforward manner from a "target end" of a foreign key relationship. The "target end" can refer to the column of a table that is referenced from a column of another table, referred to as the "source end". In illustration, the ORDER_ID column in the ORDERS table can be considered the target end of a foreign key such as the ORDER_ID column in the ORDERDETAILS table, which can be the source end. The source end of the foreign key relationship can be associated with the same type name as the target end. It should be appreciated that a column may be the target end of multiple foreign key relationships if several tables use the column as a foreign key.

Thus, table 600 includes a listing of the primary and foreign keys for each of the tables illustrated with reference to FIG. 3. Each of the column names has been assigned a type. Common column names corresponding to keys are assigned common types. For example, PART_ID, whether in the PARTS table or the ORDERDETAILS table, has been assigned the type of PartIDType. Typing constraints indicate which portlet can exchange particular kinds, i.e. types, of data with other portlets. Portlets associated with a given type can exchange the data associated with columns of that type to drive related queries.

A foreign key relationship can be modeled as a directed arrow pointing from the source end to the target end. The entire set of foreign key relationships determined by examination of the data model, in this case the database schema, forms a forest with roots corresponding to target ends of relationships which do not function as source ends for other relationships. Circular relationships are not permitted when specifying foreign key relationships in a database. The roots can be considered sinks as arrows point into the roots, but do not extend outward from the roots. When ascertaining the types, the particular naming convention used is not intended to limit the present invention. Still, each column that is part of the same tree should be mapped to the same type. Additionally, columns which are part of different forests should be mapped to different types.

In one embodiment, the column name associated with the root of each tree can be used to derive the type name associated with the entire tree. For example, if the root of a tree is associated with a column named "PartID", the type name associated with each of the columns in the tree can be set to "PartIDType". An option can be provided within the development tool which allows the user to change the default choice of type name for any particular tree.

Within IBM WebSphere Portal products, a namespace can be specified along with a type. The namespace is a mechanism that prevents collisions between different types that inadvertently have the same name. For example, it may be the case that portlets available from different vendors utilize two different types which coincidentally share the same name. The namespace mechanism can be used to scope the types to the database whose relationships are being examined since foreign key relationships do not span databases. For example, a namespace value of "http://www.myCo.com/db/ORDER-SDB" can be used for all of the types.

In one embodiment, where the portlets are implemented using the Java® programming language, for example where Java® Server Pages or another dynamic content creation technology is used to render content from a portlet to the portal page, value(s) transmitted from one portlet to another at runtime can be transmitted as an arbitrary Java® class. If no class is specified, a default of java.lang.String can be used. A non-default class must be explicitly associated with the type. SQL types can be mapped to java types so that the java types suited to the data obtained from the queried data source are used. For example, an SQL type of VARCHAR can be mapped to java.lang.String, INTEGER can be mapped to java.lang.Integer, BIGINT can be mapped to java.lang.Long, etc. Java Database Connectivity (JDBC) defines recommended SQL to Java® type mappings which can be used in the embodiments disclosed herein.

When creating a portlet, the development tool can automatically add code to the portlet that registers the types corresponding to the columns to be accessed by the portlet. This code can register the types with the portal system. In an embodiment where WebSphere Portal products are used, icons can be automatically inserted into the table display for triggering actions on other portlets which process the same types as are registered with the portlet being created. Such is the case, for example, with reference to click-to-action controls. If wires are used, code is inserted that ensures when a particular type is published, an action in a different portlet is triggered.

FIG. 7 is a table 700 illustrating exemplary portlet actions that can be automatically determined and generated in accordance with one embodiment of the present invention. After examination of the data model, the development tool can automatically generate and register portlet actions for driving queries against the tables. The queries can utilize the type mapping for the foreign key(s) in the table directly and also take the type mapping for foreign keys which are transitively related to the table through joins. Continuing with the database schema illustrated in FIG. 3, the portlet actions illustrated in FIG. 7 can be generated automatically for each respective table.

In illustration, from the data model, portlet actions for querying the ORDERS table can be automatically generated. One query can retrieve information from the ORDERS table using the primary key corresponding to OrderIDType. Another query can retrieve information from the ORDERS table using the foreign key corresponding to CustomerID-Type. An additional query can be generated which allows the PartIDType to be used to query the ORDERS table. Such a query can be created as the PART_ID is a foreign key of the ORDERDETAILS table which can be used to index into the ORDERS table. In one embodiment, one portlet can be implemented for each action name listed in table 700. In another embodiment, a portlet can perform a plurality of the action specified in table 700.

Figure 8:
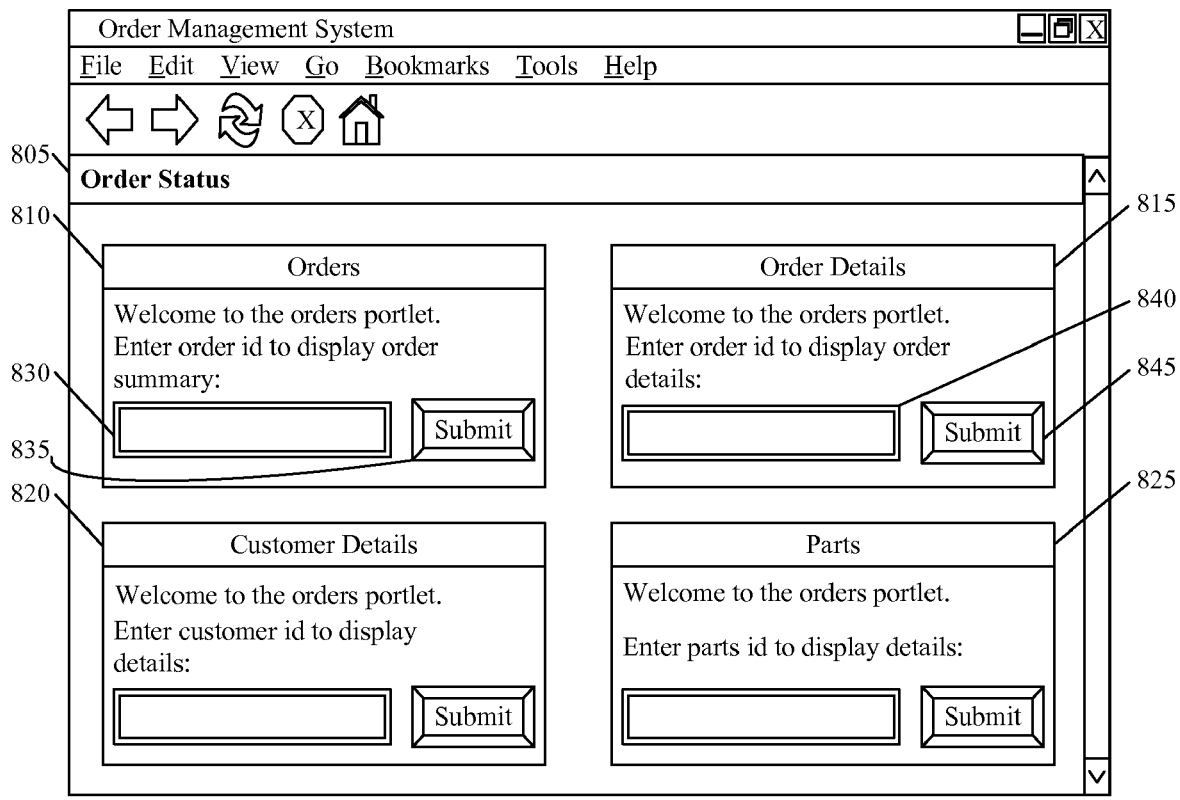
FIG. 8 is a view of a graphical user interface which is useful for understanding the embodiments disclosed herein.

FIG. 8 is a view of a graphical user interface (GUI) 800 which is useful for understanding the embodiments disclosed herein. The GUI 800 illustrates a portal page 805 being displayed within a browser. The portal page 805 includes four portlets. In particular, portal page 805 includes an Orders portlet 810, an Order Details portlet 815, a Customer Details portlet 820, and a Parts portlet 825. Each of the portlets 810-825 can be generated automatically by the development tool after evaluation of the data model specification describing the source data that the portlets 810-825 are to query.

In addition to querying each respective portion of the source data, i.e. a table, each portlet 810-825 further can be configured to communicate with other portlets also disposed on the same portal page 805. As noted, links such as wires or click-to-action controls can be used to drive communications between the portlets 810-825. These links can be inserted automatically within one or more portlets located on a same portal page 805 as shown in FIG. 8.

For purposes of illustration, it can be assumed that the name of each portlet corresponds to the name of the table that the portlet is configured to access. Thus, the Orders portlet 810 can be configured to query the ORDERS table, etc. With the Orders portlet 810 and the Order Details portlet 815 being located on the same portal page, a click-to-action control can be inserted into the orders portlet 810 which causes a query for a particular order being performed in the Orders Portlet 810 to drive a query in the Orders Details portlet 815 automatically. This relieves the user from having to manually enter an order identifier into the data field 830 of the orders portlet 810, click the submit button 835, enter the same order identifier into the data field 840 of the Order Details portlet 815, and then click the submit button 845. Instead, the user simply enters an order identifier into the data field 830 and clicks the submit button 835. The Orders Portlet 810 then drives the Order Details portlet 815 causing it to execute a query on the same order without the user taking any further action.

Similarly, click-to-action controls can be used to cause the Parts portlet 825 to obtain part information for the order being queried in the Order portlet 810 and the Order Details portlet 820. The controls for triggering inter-portlet communication can be dynamically created according to the particular portlets to be located on a same portal page 805.

In another embodiment of the present invention, further controls or settings can be introduced to limit the number of allowable joins. For example, join operations within a database can be expensive in terms of runtime performance. Accordingly, the development tool can be configured, i.e. via user preference, with a maximum allowable number of joins or a maximum cost in terms of operations involved in joins based upon estimated table sizes. This would serve as a mechanism for limiting the automatic generation of inter-portlet communication capabilities. Once generated, portlets can be further customized by the tool user in any of a variety of different ways, i.e. adding additional couplings to other portlets, removing automatically generated couplings, or the like.

Figure 9:
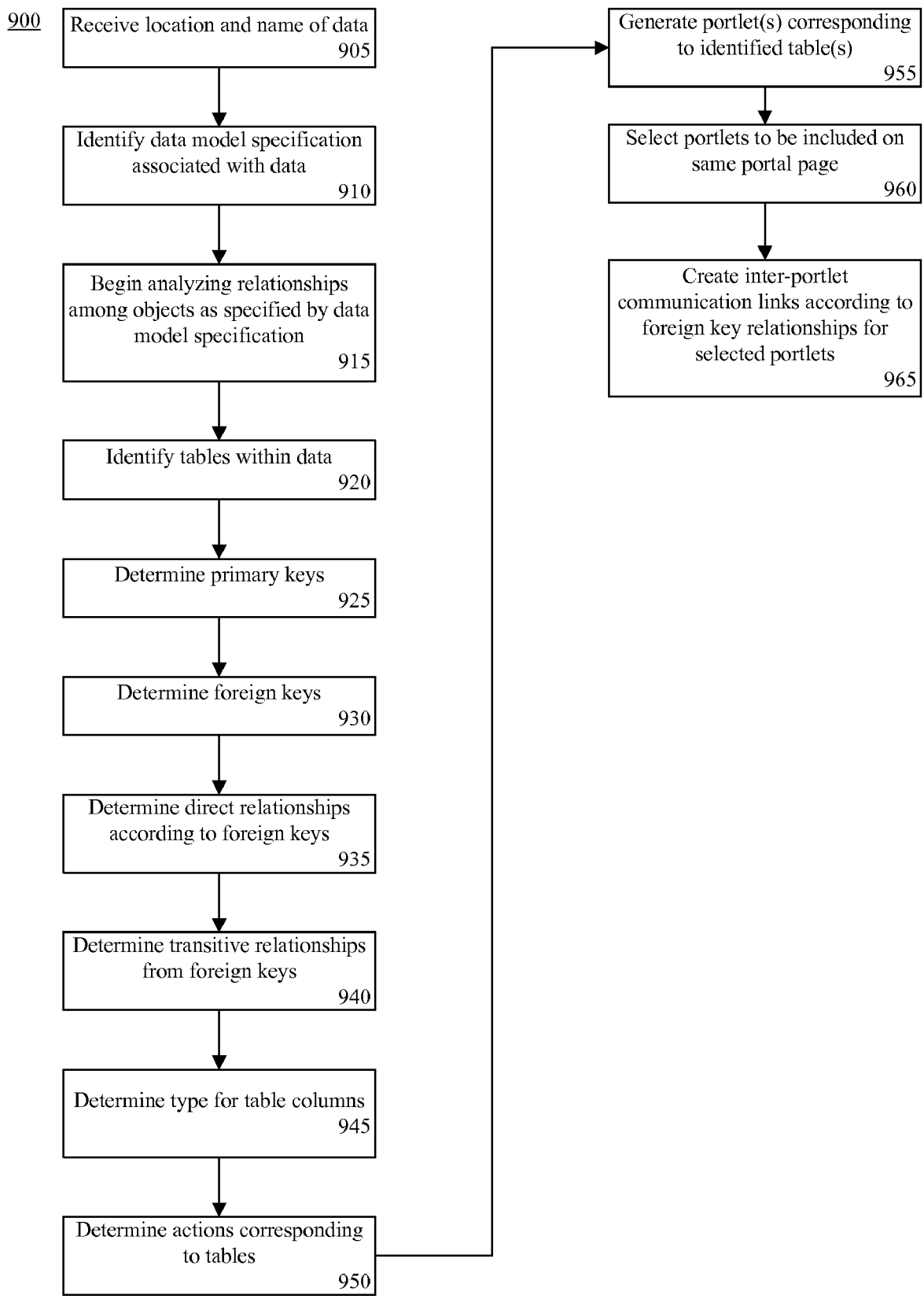
FIG. 9 is a flow chart illustrating a method of dynamically creating portlets in accordance with another embodiment of the present invention.

FIG. 9 is a flow chart illustrating a method 900 of dynamically creating portlets in accordance with another embodiment of the present invention. Method 900 can be performed by a development tool for use with a portal system as described herein. For purposes of illustration, method 900 will be described using a database as the data source. As noted, however, any source of structured data having a data model specification available to describe that structure can be used with the embodiments described herein.

Accordingly, in step 905, a developer can provide the development tool with identifying information for the data source for which portlets are to be created. More particularly, the developer can provide the name and location of the data source. In step 910, the development tool can identify the data model specification associated with the particular data source identified in step 905. The data model specification can be loaded into the development tool.

In step 915, the development tool can begin analyzing, i.e. introspecting, the data model specification to ascertain the various relationships and dependencies between the objects included in the data source. In step 920, from the data model specification, the various tables of the data source can be identified. In step 925, the primary keys for each table can be identified. In step 930, the foreign keys within each table of the data source can be identified.

In step 935, direct relationships among tables can be determined according to the foreign keys. As noted, a direct relationship refers to a relationship among a plurality of tables, or table columns, which does not involve a join operation. In step 940, transitive relationships can be determined. A transitive relationship refers to a relationship between a plurality of tables, or table columns, which involves at least one join operation. In step 945, types for the various columns of the tables can be determined. In step 950, the various actions that can be performed upon each table can be determined, as well as whether such actions involve a join operation, i.e. are transitive, and the like.

In step 955, a plurality of portlets can be created automatically. That is, the code necessary for implementing a plurality of portlets for accessing the information contained in the tables described by the data model specification can be generated. In one embodiment, at least one portlet can be created for each table of the data. Each portlet can be configured to perform at least one action in terms of querying the table corresponding to that portlet. The development tool can generate portlets having at least a minimum amount of functionality. For each portlet created, the development tool can create code artifacts such as Java® Server Pages controls, portlet logic, as well as a configuration file for driving a database mediator library.

In step 960, one or more portlets can be selected for inclusion on a single portal page. In step 965, inter-portlet communication links can be created automatically for each portlet to be located on a same portal page. Further, it should be appreciated that inter-portlet communication links can be created according to direct relationships and/or transitive relationships. If a user preference is set as to the number of allowable transitive relationships or operations, the inter-portlet communication links can be created in accordance with such limitations.

The embodiments disclosed herein provide a solution for creating portlets in an automated fashion. Rather than querying a developer for metadata relating to a database or other source of structured data, relationships between objects in the data can be ascertained automatically from a data model specification. Using the determined relationships, portlets can be coded automatically. Further, inter-portlet communications can be configured automatically according to direct and transitive relationships determined from the data model specification.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general-purpose computer system with a computer program that, when being loaded and executed, controls the computer system such that it carries out the methods described herein. The present invention also can be embedded in a computer program product, which comprises all the features enabling the implementation of the methods described herein, and which when loaded in a computer system is able to carry out these methods.

The terms "computer program", "software", "application", variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an", as used herein, are defined as one or more than one. The term "plurality", as used herein, is defined as two or more than two. The term "another", as used herein, is defined as at least a second or more. The terms "including" and/or "having", as used herein, are defined as comprising, i.e. open language. The term "coupled", as used herein, is defined as connected, although not necessarily directly, and not necessarily mechanically, i.e. communicatively linked through a communication channel or pathway or another component or system.

This invention can be embodied in other forms without departing from the spirit or essential attributes thereof. Accordingly, reference should be made to the following claims, rather than to the foregoing specification, as indicating the scope of the invention.

What is claimed is:

1. A method of automatically creating portlets for a portal system comprising:
   identifying a location of structured data described by a data model specification;
   automatically determining, by a computer, from the data model specification, relationships between a plurality of objects within the structured data, wherein the data model specification is automatically introspected to identify primary keys associated with each of the plurality of objects and foreign key relationships between the plurality of objects;
   automatically generating a plurality of portlets, wherein each portlet is automatically generated for each object of the plurality of objects according to the relationships specified within the data model specification, wherein at least one function, for querying the structured data, of each portlet is automatically determined by a foreign key relationship of the object associated with each portlet, and wherein automatically generating a plurality of portlets further comprises generating code in at least a first portlet of the plurality of portlets that triggers the action in at least a second portlet of the plurality of portlets according to the relationships specified within the data model specification; and automatically creating at least one communication link between at least two of the plurality of portlets according to the relationships specified within the data model specification, wherein over the communication link the first portlet of the at least two portlets triggers an action within the second portlet of the at least two portlets, and responsive to that action, the second portlet sends data to the first portlet, wherein at least one of the first portlet or the second portlet is displayed within a portal page.

2. The method of claim 1, wherein automatically determining relationships from the data model specification further comprises identifying selected relationships from a plurality of relationships specified within the data model specification according to a user-specified attribute.

3. The method of claim 1, wherein automatically creating at least one communication link further comprises generating inter-portlet communication links for selected portlets of the plurality of portlets according to a user-specified attribute.

4. The method of claim 1, further comprising identifying transitive relationships between the plurality of objects within the structured data.

5. The method of claim 1, further comprising configuring the first portlet to pass an object to the second portlet.

6. The method of claim 1, wherein automatically creating at least one communication link further comprises:
responsive to receiving a user input specifying a selected plurality of portlets to be located on the same portal page, automatically generating and inserting code into each selected portlet to be located on the same portal page, wherein the inserted code implements inter-portlet communication among the plurality of selected portlets.

7. The method of claim 1, wherein the structured data is a database and each object within the structured data is a table of the database, wherein automatically generating a plurality of portlets comprises automatically generating at least one portlet for each table of the database.

8. The method of claim 1, further comprising automatically introspecting the structured data to a user specified level that is independent of a level of inter-portlet connections generated.

9. A method of automatically implementing portlets for a portal system comprising:
receiving a user input specifying data having a structure specified by a data model specification;
automatically analyzing the data model specification;
automatically identifying, by a computer, relationships between objects in the data, wherein the data model specification is automatically introspected to identify primary keys associated with each object, and foreign key relationships between the objects;
automatically creating a plurality of portlets that includes at least one portlet for each object in the data, each of said plurality of portlets being configured to access the data according to the relationships identified between the objects, wherein the functions of each portlet are automatically determined by the foreign key relationships of the object associated with each portlet, and wherein automatically creating a plurality of portlets further comprises generating code in at least a first portlet of the plurality of portlets that triggers the action in at least a second portlet of the plurality of portlets according to the relationships specified within the data model specification; and automatically generating code in at least the first portlet of the plurality of portlets for communicating with at least the second portlet of the plurality of portlets according to the relationships identified between the objects, wherein the first portlet communicating with the second portlet triggers an action within the second portlet, and responsive to that action, the second portlet sends data to the first portlet, wherein at least one of the first portlet or the second portlet is displayed within a portal page.

10. The method of claim 9, wherein automatically generating code further comprises creating at least one wire communicatively linking the first portlet with the second portlet.

11. The method of claim 9, wherein automatically generating code further comprises creating a click-to-action control communicatively linking the first portlet with the second portlet.

12. The method of claim 9, wherein automatically generating code further comprises:
responsive to receiving a user input specifying a selected plurality of portlets to be located on the same portal page, automatically generating and inserting code into each selected portlet to be located on the same portal page, wherein the inserted code implements inter-portlet communication among the plurality of selected portlets.

13. A computer readable storage, having stored thereon a computer program having a plurality of code sections, that, when executed by a computer, cause the computer to perform a plurality of steps, the computer readable storage comprising:
code for identifying a location of structured data described by a data model specification;
code for automatically determining, by a computer, from the data model specification, relationships between a plurality of objects within the structured data, wherein the data model specification is automatically introspected to identify primary keys associated with each of the plurality of objects and foreign key relationships between the plurality of objects;
code for automatically generating a plurality of portlets, wherein at least one portlet is automatically generated for each object of the plurality of objects according to the relationships specified within the data model specification, wherein at least one function, for querying the structured data, of each portlet is automatically determined by a foreign key relationship of the object associated with each portlet, and wherein automatically creating a plurality of portlets further comprises generating code in at least a first portlet of the plurality of portlets that triggers the action in at least a second portlet of the plurality of portlets according to the relationships specified within the data model specification; and
code for automatically creating at least one communication link between at least two of the plurality of portlets according to the relationships specified within the data model specification, wherein over the communication link the first portlet of the at least two portlets triggers an action within the second portlet of the at least two portlets, and responsive to that action, the second portlet sends data to the first portlet, wherein at least one of the first portlet or the second portlet is displayed within a portal page.

14. The computer readable storage of claim 13, wherein the code for automatically determining relationships from the data model specification further comprises code for identifying selected relationships from a plurality of relationships specified within the data model specification according to a user-specified attribute.

15. The computer readable storage of claim 13, wherein the code for automatically creating at least one communication link further comprises code for generating inter-portlet communication links for selected portlets of the plurality of portlets according to a user-specified attribute.

16. The computer readable storage of claim 13, further comprising code for identifying transitive relationships between the plurality of objects within the structured data.

17. The computer readable storage of claim 13, further comprising code for configuring the first portlet to pass an object to the second portlet.

* * * * *